Nov. 30, 1965 W. RASKIN 3,220,472
HEAT EXCHANGE PANEL AND METHOD OF MAKING SAME
Filed April 13, 1961
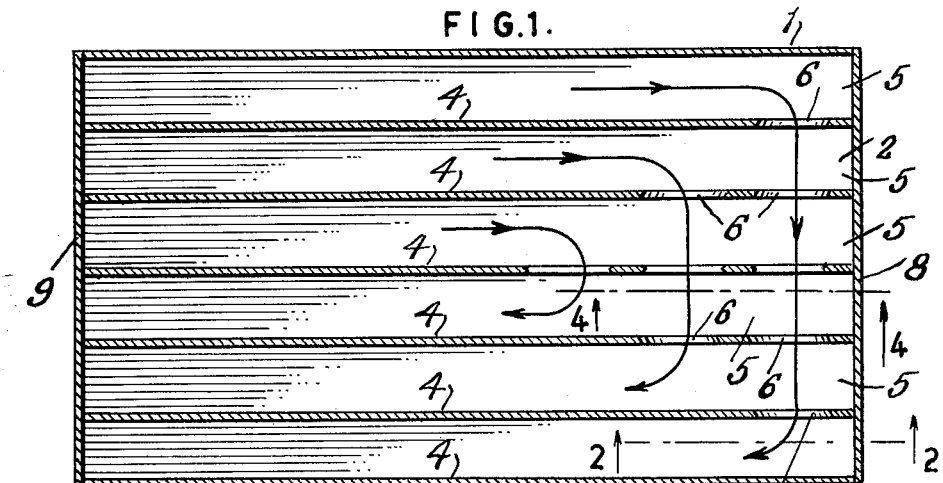
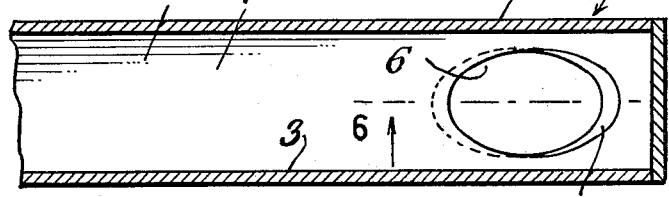
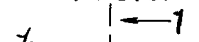
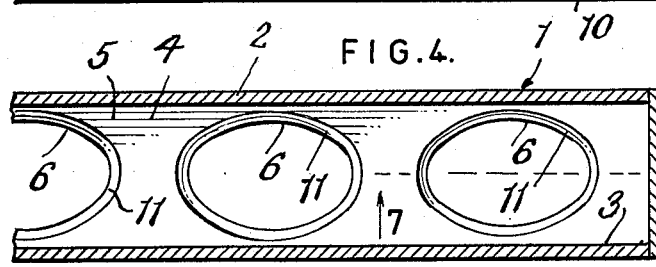
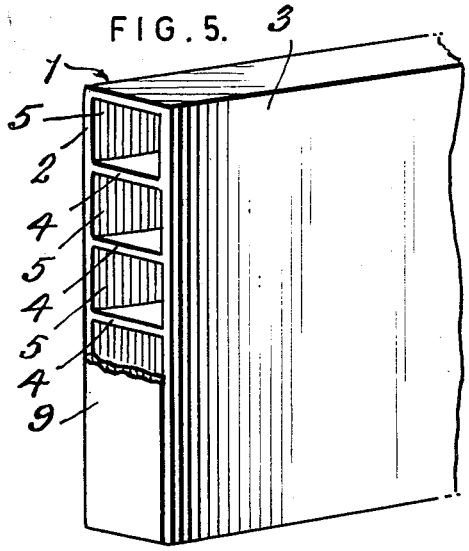
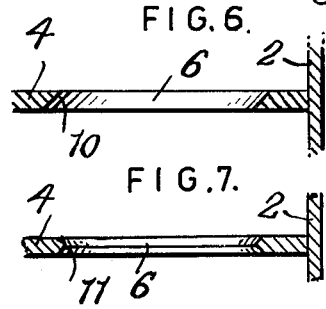
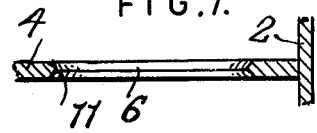
INVENTOR
Walter Raskin
BY
ATTORNEY

2

United States Patent Office 3,220,472
Patented Nov. 30, 1965

3,220,472
HEAT EXCHANGE PANEL AND METHOD OF MAKING SAME
Walter Raskin, Brooklyn, N.Y., assignor to Dean Products, Inc., Brooklyn, N.Y., a corporation of New York
Filed Apr. 13, 1961, Ser. No. 102,713
1 Claim. (Cl. 165—172)

This invention relates to heat exchange panels and constitutes an improvement on the type of heat exchange panel as generally known and in use at the present time, and a new method of making the same. Such type of heat exchange panel as widely used at present, usually consists of a pair of facially attached plates, one or both of which is undulated to provide for a series of channels for the flow of heat exchange fluid between the plates.

Such known types of heat exchange panels, while possessing numerous advantages, are relatively expensive to manufacture, and since one or both of the faces of the panels are grooved or irregular, particles, sediment or other foreign matter can collect in the grooves and cleansing of the surfaces of the panel is thus rendered difficult.

It is therefore an object of the present invention to provide a panel which will be perfectly flat and smooth on both of its outer faces, thus enabling it to be maintained clean and sanitary with a minimum of effort, and which can be produced by simple manufacturing methods, such as, for example, extrusion, casting or the like.

It is an object of the invention to provide a panel of this type in which the parts are largely of integral formation, and in which a novel arrangement of communicating means between the several channels in the panel are provided.

More particularly, the invention contemplates the provision of a panel body composed of a pair of metallic spaced-apart, parallel, flat face plates which are connected by regularly spaced webs or partitions, such webs or partitions being preferably formed integrally with the face plates and so spaced as to co-operate with the face plates in forming channels for the heat exchange fluid between them, openings being provided at the required locations in the webs or partitions to thereby provide for communication between the several channels and to thus attain desired flow of the heat exchange fluid. End plates are provided at the opposite ends of the panel body to thereby close the ends of the channels, and inlet and outlet openings are located wherever required in the panel body or in the end plates for the entry and outflow of the refrigerant.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a vertical sectional view through a heat exchange panel made in accordance with the invention, the view being taken on the line 1—1 of FIG. 3, looking in the direction of the arrows;

FIG. 2 is a sectional view, on an enlarged scale, the view being taken substantially on the line 2—2 of FIG. 1, looking in the direction of the arrows;

FIG. 3 is an enlarged end view of the panel, as seen from the left of FIG. 1, with the end plate at that end removed;

FIG. 4 is a sectional view, taken substantially on the line 4—4 of FIG. 1, looking in the direction of the arrows;

FIG. 5 is a perspective view of one end of the panel, with a part of the end plate thereat broken away;

FIG. 6 is a sectional view, taken substantially on the line 6—6 of FIG. 2, looking in the direction of the arrows, and FIG. 7 is a sectional view, taken substantially on line 7—7 of FIG. 4, looking in the direction of the arrows.

The body of the heat exchange panel is generally indicated at 1, and it is a relatively large flat structure composed of a pair of spaced-apart, similar, parallel face plates 2 and 3, the shape and size of which determines the shape and size of the panel. The face plates 2 and 3 are connected by a plurality of spaced apart, parallel webs 4 having their planes at right angles to the planes of the face plates, with their regular spacing resulting in the formation of rectangular refrigerant channels 5 between them. The body of the panel may be made in various ways, such as by casting, extrusion, forging or by other means, the webs or partition members 4 being formed integrally with the face plates 2 and 3 and being made of about the same thickness as the face plates so that the entire body of the panel, with the exception of end plates mounted thereon, is of one-piece construction.

In many heat exchange panels as constructed at the present time, two plates are facially welded together at spaced-apart locations, with one or both of the plates provided with undulations that form the refrigerant channels between the plates. Such an arrangement results in one or both of the faces of the panel being recessed or of irregular form due to the undulations in the ribbed plate or plates forming the panel. The cleaning of such grooved or ribbed panels is difficult, the optimum sought being a panel which is without facial ribbing or undulations and which has its opposite faces perfectly flat and smooth so that cleaning and maintenance of the panel in a sanitary condition is simplified. The face plates 2 and 3 of the present invention have perfectly flat and smooth exposed faces, as clearly seen in FIG. 5, and as a result, they can be easily cleaned and the panel maintained in a sanitary condition with a minimum of effort.

In order to provide for the proper flow of the heat exchange fluid through the channels 4, communication between the channels must be established, and in the embodiment of the invention as disclosed in the drawing, openings 6 are formed in the webs or partitions 4 at suitable locations, and generally toward one end of the panel, to thereby establish the required communication between the channels. These openings may be made in various shapes and the oval form shown in the drawing has been found satisfactory but not absolutely essential since other forms may be used. The openings 6 in the webs or partitions 4 can be formed by drilling, cutting, piercing, stamping or by other means. These openings are positioned according to the desired flow arrangement, the openings positioned as shown in FIG. 1 being so located that the flow of the refrigerant takes place in the manner indicated by the arrows. The openings 6 may be so positioned that a series flow, series parallel flow, or full parallel flow may be obtained, such variations in the flow pattern being obtained by the position of the several openings 6 in the partitions.

The opposite ends of the body 1 on the panel are closed by plates 8 and 9, which may be welded in place or otherwise secured with a tight joint. Inlet and outlet fittings of known character may also be provided at required points, entering either of the face plates or extending through the end plate 9. The flow through the several openings 6 is facilitated by providing bevelled edges 10 on some of the openings as shown in FIG. 6, or by tapering the edges on others of the openings as shown at 11 in FIG. 7.

The panel is one which can be easily and economically manufactured, and one which is strong and sturdy. It can be easily cleaned, and by the openings in its webs or partitions it provides a simple means by which communication between the refrigerant channels can be established for the securement of free, smooth flow of the refrigerant.

A feature of the present invention resides in the provision of passages or channels through the panel which are of substantial cross-sectional size as compared to the thickness of the partition walls 4 which separate them. The walls 4 are of uniform thickness for their widths from the points of their integral attachment to the face plates 2 and 3; the channels defined by the walls and face plates are of rectangular form, and the width of the channels is much more than the thickness of the walls 4. Heretofore fluid-circulating plates have been produced by drilling parallel holes through a thick metal plate to provide fluid passages through such a plate. Such a plate requires careful and expensive drill-work; the produced passages have thick separating walls between them and the capacity of the plate so produced is small. In addition, the formation of the passages by drilling, limits the length in which the plates can be made.

The plate of the present invention requires no drilling for the production of its fluid passages; the separating partition walls 4 are thin; the fluid passages are rectangular and are far greater in width than the thickness of the walls 4; the walls are of uniform thickness and define square or rectangular passages, and finally, the panel with its integrally formed partitions can be produced in any desired lengths by extrusion or similar means.

Having thus described a single embodiment of the invention, it is obvious that the same is not to be restricted thereto, but is broad enough to cover all structures coming within the scope of the annexed claim.

What I claim is:

A heat exchange panel comprising a pair of thin rectangular planar face plates disposed in spaced parallel relation, a pair of end plates sealingly secured in parallel relation to opposite ends of said spaced face plates, and a plurality of thin rectangular planar webs sealingly secured at their periphery in spaced parallel relation between the upper and lower margins of said face and end plates, said face and end plates forming with said webs a plurality of parallel isolated channels each having a rectangular cross-section, said webs at the upper and lower margins of said side and end plates closing said heat exchange panel, intermediate ones of said webs having transverse aligned apertures therethrough providing communication between adjacent channels, an intermediate one of said webs including longitudinally spaced apertures equal to one-half the number of spaced channels in said heat exchange panel, and said webs disposed on opposite sides of said intermediate web progressively including at least one less aperture than the number of apertures extending through a next adjacent innermost web, apertures of adjacent webs being disposed in substantially aligned relation and said aperture being formed with a beveled edge to facilitate fluid flow through said channels.

References Cited by the Examiner

UNITED STATES PATENTS

| 1,664,628 | 4/1928 | Kessler | 165—168 |
| 1,790,114 | 1/1931 | Schranz | 165—137 |
| 1,968,813 | 8/1934 | Ackerman. | |
| 2,001,923 | 5/1935 | Robertson et al. | 165—168 |
| 2,572,972 | 10/1951 | Baldwin | 165—178 |
| 2,602,648 | 7/1952 | Martel | 165—168 X |
| 2,626,130 | 1/1953 | Raskin | 62—526 |
| 2,662,273 | 12/1953 | Long | 29—153.3 |
| 2,699,325 | 1/1955 | Hedin | 165—168 |
| 2,966,728 | 1/1961 | Balfour | 29—153.3 |

CHARLES SUKALO, *Primary Examiner.*

HERBERT L. MARTIN, *Examiner.*